US009189478B2

(12) United States Patent
Baris et al.

(10) Patent No.: US 9,189,478 B2
(45) Date of Patent: Nov. 17, 2015

(54) SYSTEM AND METHOD FOR COLLECTING DATA FROM AN ELECTRONIC DOCUMENT AND STORING THE DATA IN A DYNAMICALLY ORGANIZED DATA STRUCTURE

(75) Inventors: Russell Baris, Westport, CT (US); Arthur Kruk, Stamford, CT (US); Jibril Gueye, Trumbull, CT (US)

(73) Assignee: ELUMINDATA, INC., Westport, CT (US)

( * ) Notice: Subject to any disclaimer, the term of this patent is extended or adjusted under 35 U.S.C. 154(b) by 282 days.

(21) Appl. No.: 12/062,401

(22) Filed: Apr. 3, 2008

(65) Prior Publication Data

US 2009/0254576 A1    Oct. 8, 2009

(51) Int. Cl.
*G06F 7/02* (2006.01)
*G06F 17/30* (2006.01)

(52) U.S. Cl.
CPC .... *G06F 17/30011* (2013.01); *G06F 17/30289* (2013.01); *G06F 17/30292* (2013.01); *G06F 17/30294* (2013.01)

(58) Field of Classification Search
CPC .............. G06F 17/30292; G06F 17/30294; G06F 17/30297; G06F 17/30289; G06F 17/30312
USPC .......... 707/204, 999.204, 755, 802, 811, 100, 707/102, 999.1, 999.102, 999.101, 999.107, 707/803, 804, 999.103, 756; 715/234, 255
See application file for complete search history.

(56) References Cited

U.S. PATENT DOCUMENTS

| | | |
|---|---|---|
| 5,175,810 A | 12/1992 | Young et al. |
| 5,293,615 A | 3/1994 | Amada |
| 5,319,777 A | 6/1994 | Perez |
| 5,359,724 A | 10/1994 | Earle |
| 5,455,903 A | 10/1995 | Jolissaint et al. |
| 5,471,612 A | 11/1995 | Schlafly |
| 5,553,215 A | 9/1996 | Kaethler |
| 5,742,835 A | 4/1998 | Kaethler |
| 5,768,158 A | 6/1998 | Adler et al. |
| 5,890,174 A | 3/1999 | Khanna et al. |
| 5,893,123 A | 4/1999 | Tuinenga |

(Continued)

OTHER PUBLICATIONS

Pedersen et al. (Multidimensional Database Technology, Aalborg University, Fredrik Bajers, Denmark, Dec. 2001, pp. 40-46).

(Continued)

*Primary Examiner* — Bruce Moser
(74) *Attorney, Agent, or Firm* — Amster, Rothstein & Ebenstein; Benjamin Halpern; Charles Macedo

(57) ABSTRACT

A method for automatically and dynamically collecting new data entered into an electronic document includes the step of providing a database having initial data and an initial data structure. The new data is retrieved as the new data is entered into the electronic document. The new data includes a data value and one or more data descriptors corresponding to the data value. One of the one or more data descriptors is assigned as a data item. The data item defines a variable the value of which varies based on the data value. One or more dimensions of the data value are determined based on at least one of the one or more data descriptors. The initial data structure is reorganized into a modified data structure based on the at least one or more dimensions and the data item, so that the new data may be stored in the modified data structure in a manner that allows the initial data and the new data to be later retrieved from the modified data structure. The new data is stored in the modified data structure.

26 Claims, 3 Drawing Sheets

(56) References Cited

U.S. PATENT DOCUMENTS

| | | |
|---|---|---|
| 5,987,481 A | 11/1999 | Michelman et al. |
| 6,055,548 A | 4/2000 | Comer et al. |
| 6,061,681 A | 5/2000 | Collins |
| 6,134,563 A | 10/2000 | Clancey et al. |
| 6,138,130 A | 10/2000 | Adler et al. |
| 6,292,811 B1 | 9/2001 | Clancey et al. |
| 6,336,124 B1 | 1/2002 | Alam et al. |
| 6,430,584 B1 | 8/2002 | Comer et al. |
| 6,444,322 B1 | 9/2002 | Li et al. |
| 6,581,068 B1 | 6/2003 | Bensoussan et al. |
| 6,640,234 B1 | 10/2003 | Coffen et al. |
| 6,701,485 B1 | 3/2004 | Igra et al. |
| 6,754,677 B1 | 6/2004 | Cho et al. |
| 6,779,152 B1 | 8/2004 | Conner et al. |
| 6,782,403 B1 | 8/2004 | Kino et al. |
| 6,799,182 B2 | 9/2004 | Bata |
| 6,886,009 B2 | 4/2005 | Jeng et al. |
| 6,889,359 B1 | 5/2005 | Conner et al. |
| 6,904,428 B2 | 6/2005 | Frieder et al. |
| 6,915,308 B1 | 7/2005 | Evans et al. |
| 6,920,609 B1 | 7/2005 | Manber et al. |
| 6,986,099 B2 | 1/2006 | Todd |
| 6,988,241 B1 | 1/2006 | Guttman et al. |
| 7,010,779 B2 | 3/2006 | Rubin et al. |
| 7,012,112 B2 | 3/2006 | Takenaka et al. |
| 7,017,112 B2 | 3/2006 | Collie et al. |
| 7,031,956 B1 * | 4/2006 | Lee et al. ............... 1/1 |
| 7,082,969 B1 | 8/2006 | Hollerback |
| 7,113,954 B2 * | 9/2006 | Vogel ............ 707/737 |
| 7,127,672 B1 | 10/2006 | Patterson et al. |
| 7,249,316 B2 | 7/2007 | Collie et al. |
| 7,269,786 B1 | 9/2007 | Malloy et al. |
| 7,650,355 B1 * | 1/2010 | Davis ............ 715/234 |
| 2001/0054034 A1 | 12/2001 | Arning et al. |
| 2002/0013786 A1 | 1/2002 | Machalek |
| 2002/0016801 A1 | 2/2002 | Reiley et al. |
| 2002/0026461 A1 | 2/2002 | Kutay et al. |
| 2002/0052893 A1 | 5/2002 | Grobler et al. |
| 2002/0055952 A1 | 5/2002 | Clancey et al. |
| 2002/0103825 A1 | 8/2002 | Bauchot |
| 2002/0129054 A1 | 9/2002 | Ferguson et al. |
| 2003/0217052 A1 | 11/2003 | Rubenczyk et al. |
| 2003/0237051 A1 * | 12/2003 | LaMarca et al. ....... 715/513 |
| 2004/0023636 A1 | 2/2004 | Gurel |
| 2004/0044954 A1 | 3/2004 | Hosea |
| 2004/0060001 A1 | 3/2004 | Coffen et al. |
| 2004/0103105 A1 * | 5/2004 | Lindblad et al. ........ 707/100 |
| 2004/0103366 A1 | 5/2004 | Peyton-Jones et al. |
| 2004/0103369 A1 | 5/2004 | Robertson et al. |
| 2004/0230571 A1 | 11/2004 | Robertson |
| 2005/0010861 A1 | 1/2005 | Augustyn et al. |
| 2005/0010862 A1 | 1/2005 | Bauchot |
| 2005/0022111 A1 | 1/2005 | Collet et al. |
| 2005/0039114 A1 | 2/2005 | Naimat et al. |
| 2005/0071750 A1 | 3/2005 | Nelson |
| 2005/0097447 A1 | 5/2005 | Serra et al. |
| 2005/0097449 A1 | 5/2005 | Lumera et al. |
| 2005/0149482 A1 | 7/2005 | Dillon |
| 2005/0187952 A1 | 8/2005 | Werner |
| 2005/0188298 A1 | 8/2005 | Makela |
| 2005/0225202 A1 | 10/2005 | Vogeley et al. |
| 2005/0251733 A1 | 11/2005 | Elkady |
| 2005/0273697 A1 | 12/2005 | Weinberg et al. |
| 2005/0278307 A1 | 12/2005 | Battagin et al. |
| 2006/0015805 A1 | 1/2006 | Humenansky et al. |
| 2006/0015809 A1 * | 1/2006 | Hattori ............ 715/513 |
| 2006/0036939 A1 | 2/2006 | Hobbs et al. |
| 2006/0048044 A1 | 3/2006 | Genesereth et al. |
| 2006/0075323 A1 | 4/2006 | Singh et al. |
| 2006/0075328 A1 | 4/2006 | Becker et al. |
| 2006/0080313 A1 | 4/2006 | Freire |
| 2006/0090129 A1 | 4/2006 | Collie et al. |
| 2006/0095833 A1 | 5/2006 | Orchard et al. |
| 2006/0101333 A1 | 5/2006 | Collie et al. |
| 2006/0184870 A1 | 8/2006 | Christen et al. |
| 2006/0184873 A1 | 8/2006 | Kamiya |
| 2006/0277163 A1 | 12/2006 | Schemer et al. |
| 2007/0219956 A1 | 9/2007 | Milton |
| 2008/0010264 A1 | 1/2008 | Morton et al. |
| 2008/0016041 A1 | 1/2008 | Frost et al. |
| 2008/0034281 A1 | 2/2008 | Handsaker et al. |
| 2008/0059502 A1 * | 3/2008 | Kobayashi ............ 707/101 |
| 2008/0126395 A1 * | 5/2008 | Marueli ............ 707/102 |
| 2008/0133510 A1 | 6/2008 | Timmons |
| 2008/0147601 A1 | 6/2008 | Chapus et al. |
| 2008/0162173 A1 * | 7/2008 | Pechenik et al. ........ 705/1 |
| 2009/0217147 A1 | 8/2009 | Thomsen |
| 2010/0223134 A1 | 9/2010 | Lunenfeld |
| 2010/0223268 A1 | 9/2010 | Papakonstantinou et al. |
| 2010/0250586 A1 | 9/2010 | Hall et al. |
| 2010/0293242 A1 | 11/2010 | Buchheit et al. |

OTHER PUBLICATIONS

Chaudhuri et al. (An Overview of Data Warehousing and OLAP Technology, Microsoft Research, Redmond, CA, vol. 26, Issue 1 (Mar. 1997), ISSN: 0163-5808).

Burnett et al., hereinafter as Burnett, "Visually Customizing Inference Rules About Apples and Oranges", Department of Computer Science, Oregon State University, Corvallis< OR 97331, USA, pp. 1-9.

Ahmad et al., hereinafter as Ahmad "A Type System for Statically Detecting Spreadsheet Errors", Computer Science Department, Brown University, Providence, RI 02912, USA, pp. 1-10.

Abraham et al., hereinafter as Abraham, "UCheck: A spreadsheet type checker for end users", School of EECS, Oregon State University, USA, pp. 72-95, 2006.

* cited by examiner

SYSTEM AND METHOD FOR COLLECTING DATA FROM AN ELECTRONIC DOCUMENT AND STORING THE DATA IN A DYNAMICALLY ORGANIZED DATA STRUCTURE

FIELD OF THE INVENTION

The present invention relates to systems and methods for collecting data in a data structure, and more specifically to collecting data in a data structure that is dynamically organized as a user enters the data into an electronic document.

RELATED APPLICATIONS

This application is related to U.S. patent application Ser. No. 11/729,373, entitled SYSTEM AND METHOD FOR AUTOMATICALLY GENERATING INFORMATION WITHIN AN ELECTRONIC DOCUMENT, filed Mar. 28, 2007.

BACKGROUND OF THE INVENTION

In current database systems, data may be stored only after the structure of the database has been designed. This is a task that generally requires a fairly high degree of technical knowledge as well as an investment in time and effort. Such structure typically includes definitions of tables and the fields contained within the tables. Additional work is required to define the relationships between different tables. Heretofore, no system or method has been developed to collect data from an electronic document and store the data in a dynamically organized data structure.

SUMMARY OF THE INVENTION

A method for automatically and dynamically collecting new data entered into an electronic document according to an exemplary embodiment of the present invention comprises the steps of: providing a database comprising initial data and an initial data structure; retrieving the new data as the new data is entered into the electronic document, the new data comprising a data value and one or more data descriptors corresponding to the data value; automatically assigning one of the one or more data descriptors as a data item, the data item defining a variable the value of which varies based on the data value; automatically determining one or more dimensions of the data value based on at least one of the one or more data descriptors; dynamically reorganizing the initial data structure into a modified data structure based on the at least one or more dimensions and the data item, so that the new data may be stored in the modified data structure in a manner that allows the initial data and the new data to be later retrieved from the modified data structure; and storing the new data in the modified data structure.

A computer readable medium according to an exemplary embodiment of the present invention has instructions executable on a computer processor for performing a method for automatically and dynamically collecting new data entered into an electronic document, and the method comprises the steps of: providing a database comprising initial data and an initial data structure; retrieving the new data as the new data is entered into the electronic document, the new data comprising a data value and one or more data descriptors corresponding to the data value; automatically assigning one of the one or more data descriptors as a data item, the data item defining a variable the value of which varies based on the data value; automatically determining one or more dimensions of the data value based on at least one of the one or more data descriptors; dynamically reorganizing the initial data structure into a modified data structure based on the at least one or more dimensions and the data item, so that the new data may be stored in the modified data structure in a manner that allows the initial data and the new data to be later retrieved from the modified data structure; and storing the new data in the modified data structure.

In at least one embodiment, the one or more dimensions of the data value are further determined based on information regarding the at least one of the one or more data descriptors as predefined in the initial data structure.

In at least one embodiment, the initial data structure comprises a virtual database.

In at least one embodiment, the initial data structure comprises a conventional database.

In at least one embodiment, the step of dynamically reorganizing comprises determining whether the initial data structure contains the one or more determined dimensions of the data value.

In at least one embodiment, if it is determined that the initial data structure contains the one or more determined dimensions, the step of dynamically reorganizing further comprises determining whether the initial data structure contains the determined data item corresponding to the data value.

In at least one embodiment, if it is determined that the initial data structure contains the determined one or more dimensions and the determined data item, the step of dynamically reorganizing further comprises selecting the initial data structure as the modified data structure.

In at least one embodiment, if it is determined that the initial data structure does not contain the determined one or more dimensions, the step of dynamically reorganizing further comprises automatically generating the modified data structure containing the determined one or more dimensions and data item.

In at least one embodiment, if it is determined that the initial data structure does not contain the determined data item, the step of dynamically reorganizing further comprises modifying the initial data structure to form the modified data structure which contains the determined data item.

In at least one embodiment, the electronic document comprises one or more of the following types of electronic documents: a spreadsheet, a business application software package, a word processing document, a webpage.

In at least one embodiment, the one or more dimensions comprises at least two dimensions.

In at least one embodiment, the initial data structure comprises a relational database.

In at least one embodiment, the initial data structure comprises a text database.

A system for automatically and dynamically collecting new data entered into an electronic document according to an exemplary embodiment of the present invention comprises: a database comprising initial data and an initial data structure; a data manager that retrieves the new data as the new data is entered into the electronic document, the new data comprising a data value and one or more data descriptors corresponding to the data value; a data analyzer that automatically assigns one of the one or more data descriptors as a data item, the data item defining a variable the value of which varies based on the data value, and that automatically determines one or more dimensions of the data value based on at least one of the one or more data descriptors; and a database manager that dynamically reorganizes the initial data structure into a modified data structure based on the at least one or more dimensions and the data item, so that the new data may be stored in the modified data structure in a manner that allows the initial data and the new data to be later retrieved from the modified data structure.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

Various exemplary embodiments of the present invention are directed to an automated system and method for dynamically generating and updating a data structure for storage of data as the data is being entered into an electronic document, such as a spreadsheet or word processing document. In the case in which the data structure is a database, the system may automatically link data in the data structure across multiple tables without the need for database programming. The inventive system preferably includes software operating on top of another program in which data may be entered by a user, such as a spreadsheet program or a word processing program. However, it should be appreciated that in other exemplary embodiments the inventive software may be operatively separate from the program in which data is entered. Alternatively, the system may be hardware provided separately or bundled with the application in which data is entered. Further, the inventive system may reside within a network, such as, for example, a local area network (LAN) or a wide area network (WAN).

The present invention may use data descriptors of a data value entered by a user to dynamically organize the entered data in a data structure. The data descriptors of the data value include at least one "data item" and at least one "dimension". The term "dimension" may also be referred to as "classification". The data value may have any suitable format, such as, for example, text, numeric, date or a rich format, such as a graphics or video file. For the purposes of the present disclosure, the term "data item" may be defined as a variable the value of which varies based on the data value, and the term "dimension" may be defined as the name of the list of the varying data descriptors that are not recognized as data items.

Figure 1:
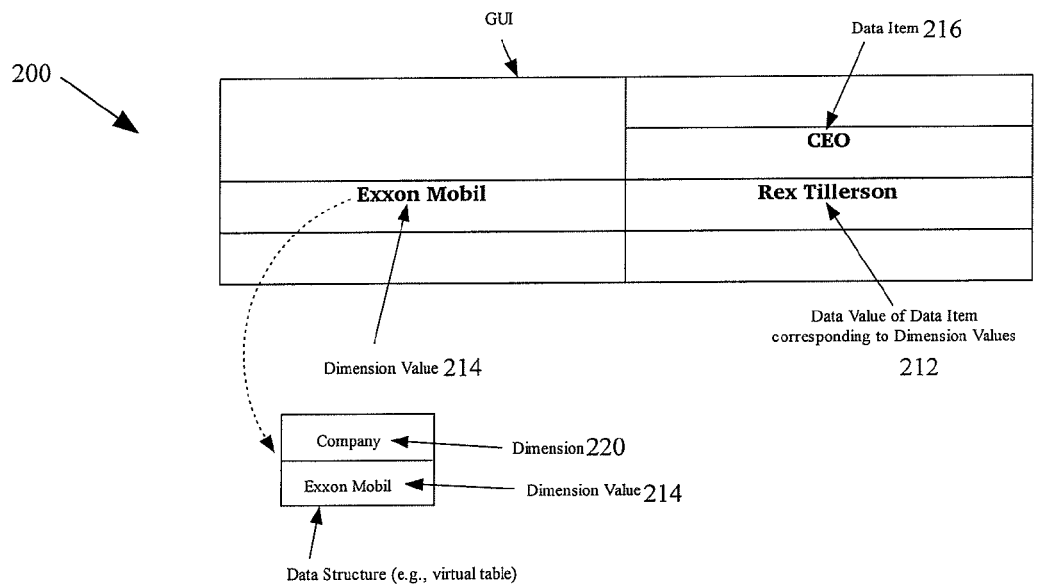
FIG. 1 shows a portion of a spreadsheet useable with various exemplary embodiments of the present invention.

The meaning of the terms "data item" and "dimension" are now clarified with reference to FIG. 1, which shows a section of a spreadsheet 200 related to company CEO information. As shown in FIG. 1, a user has entered the value "Rex Tillerson" for the CEO information related to the company Exxon Mobil. Thus, the data value 212 is "Rex Tillerson" and the data descriptors 214, 216 related to the data value 212 are the row and column headers corresponding to the data value (i.e., "CEO" and "Exxon Mobil"). Since the value of the variable "CEO" varies based on the input data value 212, the data descriptor "CEO" is a data item. The remaining data descriptor is "Exxon Mobil", and thus "Exxon Mobil" is considered a "dimension value". Since the name of the list related to the dimension value "Exxon Mobil" is "Company", "Company" is a dimension 220 of the data value 212 "Rex Tillerson".

The system according to various exemplary embodiments of the present invention may use metadata to evaluate the data descriptors to determine which data descriptors are data items and which are dimensions. Metadata used to evaluate the data descriptors may be accessed from a variety of repositories, including the dynamic data structure, itself. Types of metadata and the ways they may be used within the present invention include:

1. Dimension is Available: The electronic document may specify the dimension for which a particular data descriptor is a member. If so, that data descriptor is the dimension value for one of the dimensions and is not likely to be the data item.

2. Dimension Relationship Exists: If a data descriptor is know to be a dimension value, then the corresponding dimension is likely to be one of the dimensions that describes the data.

3. Existing Data Item: If a data descriptor is already used as a data item elsewhere in the dynamic data structure, then that data descriptor is likely to be the data item for the data currently being analyzed.

4. Time Values: If the data descriptor is a recognized date/time format, the dimension for that data descriptor is likely to be the dimension pertaining to that time/date format (e.g., Dimension=Month for Data Descriptor=June-2006; Dimension=Year for Header=2007).

5. If there are no data descriptors identified as the likely data item or if there are more than one recognized data item, the tie may be broken by the placement of the data descriptors within the electronic document. For example, in the case in which the electronic document is a spreadsheet, in determining data items, the column headers may take precedence over row headers and the headers closer to the data value may take precedence over headers that are further away.

Figure 2:
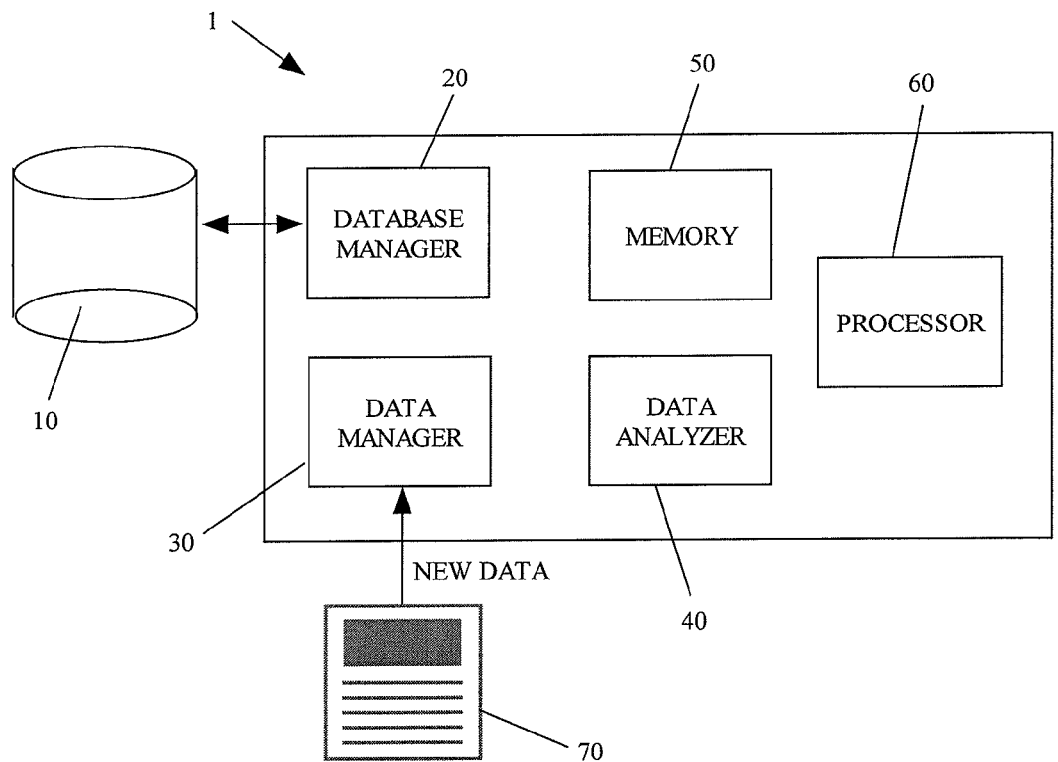
FIG. 2 is a block diagram of a system for dynamically generating and updating a data structure for storage of data as the data is being entered into an electronic document according to an exemplary embodiment of the present invention.

FIG. 2 is a block diagram of a system, generally designated by reference number 1, for dynamically generating and updating a data structure for storage of data as the data is being entered into an electronic document according to an exemplary embodiment of the present invention. The system 1 includes a data structure 10, a data structure manager 20, a data manager 30, a data analyzer 40, a memory unit 50, and a processor 60. The various components of the system 1 may generate instructions that are executable on the processor 60. In this regard, the various components may be made up of computer software components, computer hardware components, or a combination of software and hardware components.

The data structure 10 may be a virtual data structure, a conventional data structure or a combination of conventional and virtual data structures. Preferably, the data structure is a database, and the database may be any suitable database structure, such as, for example, a relational database or a text database. Also, the data structure 10 is preferably dynamically modifiable, so that, as explained in further detail below, the system 1 may automatically and dynamically modify the data structure 10 for proper storage and later retrieval of data as the data is entered into an electronic document 70. The data structure 10 may be located remote from the other components of the system 1, such as, for example, in remote communication over an Internet connection, or integrated within the system 1.

The data manager 30 collects data from the electronic document 70 as the data is entered into the electronic document 70. In this regard, the electronic document 70 may be, for example, a spreadsheet, a document generated by a business application software package, a word processing document or a webpage. Preferably, the data manager 30 is capable of recognizing the new data and data previously entered into the electronic document as data values and corresponding data descriptors. In this regard, a rule-based algorithm may be used to determine the data values and data descriptors. For example, such an algorithm may use rules based on the relative location or the format of the entered data within the electronic document 70, or such rules may predefine a specific data entry as a data value or a dimension. As a further example, in the case in which the electronic document 70 is a spreadsheet, the data manager 30 may recognize data located at the intersection of rows and columns as data values, and the row and column headers as data descriptors. It should be appreciated that the present invention is not limited to the use of a rule-based algorithm for the determination of data values and data descriptors. For example, the data manager 30 may communicate with a user to determine the context in which an ambiguous term is used (e.g., the term "Ford", which may refer to the automobile manufacturer, the brand of automobile or the person). In this regard, the data manager 30 may communicate with the user by, for example, a dialog box, instant message or e-mail.

For each newly entered data value, the data analyzer 40 automatically assigns one of the corresponding data descriptors recognized by the data manager 30 as a data item and automatically determines the dimensions of the data value based on the remaining data descriptors. As discussed previously, the data analyzer 40 may use metadata corresponding to the data descriptors to determine the data items and dimensions. In at least one exemplary embodiment, the metadata relating to the data descriptors may be found in the data structure 10. In this regard, it should be appreciated that in various exemplary embodiments of the present invention, the dimension corresponding to a data value is not necessarily related to the hierarchy of the data structure.

The data structure manager 20 dynamically reorganizes the data structure 10 so that the newly entered data may be stored in the data structure 10 in a manner that allows the newly entered data to be later retrieved from the data structure 10. In this regard, the data structure manager 20 may analyze the previously entered dimensions and data items to determine whether the data structure 10 requires modification by adding the dimensions and data items determined by the data analyzer 40 in order to accommodate storage and retrieval of the newly entered data. Alternatively, if the previously entered dimensions and data items within the data structure 10 are already able to accommodate the newly entered data, no modification of the data structure 10 may be required, and the newly added data may simply be added to the unmodified data structure 10. For example, in various exemplary embodiments of the present invention, the data item may have two or more data values, in which case the data structure may not need to be modified to accommodate the two or more data values. However, in other embodiments, the initial data structure may need modification to allow for entry and storage of two or more data values relating to a data item.

Figure 3:
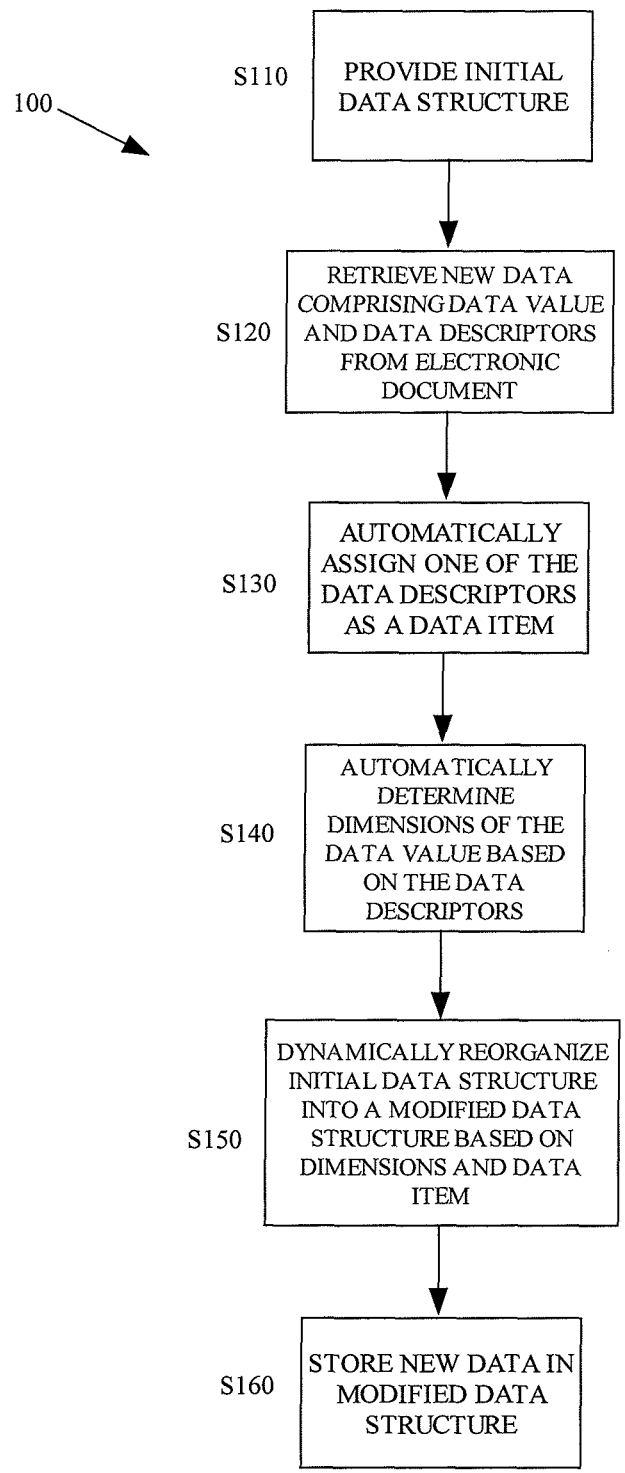
FIG. 3 is a flowchart showing a method of dynamically generating and updating a data structure for storage of data as the data is being entered into an electronic document according to an exemplary embodiment of the present invention.

FIG. 3 is a flowchart showing a method, generally designated by reference number 100, of dynamically generating and updating a data structure for storage of data as the data is being entered into an electronic document according to an exemplary embodiment of the present invention. The method 100 may be implemented on a computer software or hardware product, and the computer or hardware product may be integrated with other computer programs, as previously discussed.

In step S110 of the method 100, an initial data structure is provided. The initial data structure may include, for example, a virtual data structure and/or a conventional data structure, and as a further example, may include a relational database and/or a text database. In S120 of the method 100, newly entered data from an electronic document, such as, for example, a spreadsheet or word processing document, is collected. Each new data entry preferably includes a data value and one or more data descriptors. As explained previously, data values and data descriptors may be recognized based on a rule-based algorithm.

In step S130, for each new data entry, one of the corresponding data descriptors recognized in step S120 is assigned as a data item, and in step S140, each one of the remaining data descriptors is recognized as a dimension value corresponding to a particular dimension. As discussed previously, the data items and dimensions of the newly entered data may be determined using metadata relating to the data descriptors.

Figure 4:
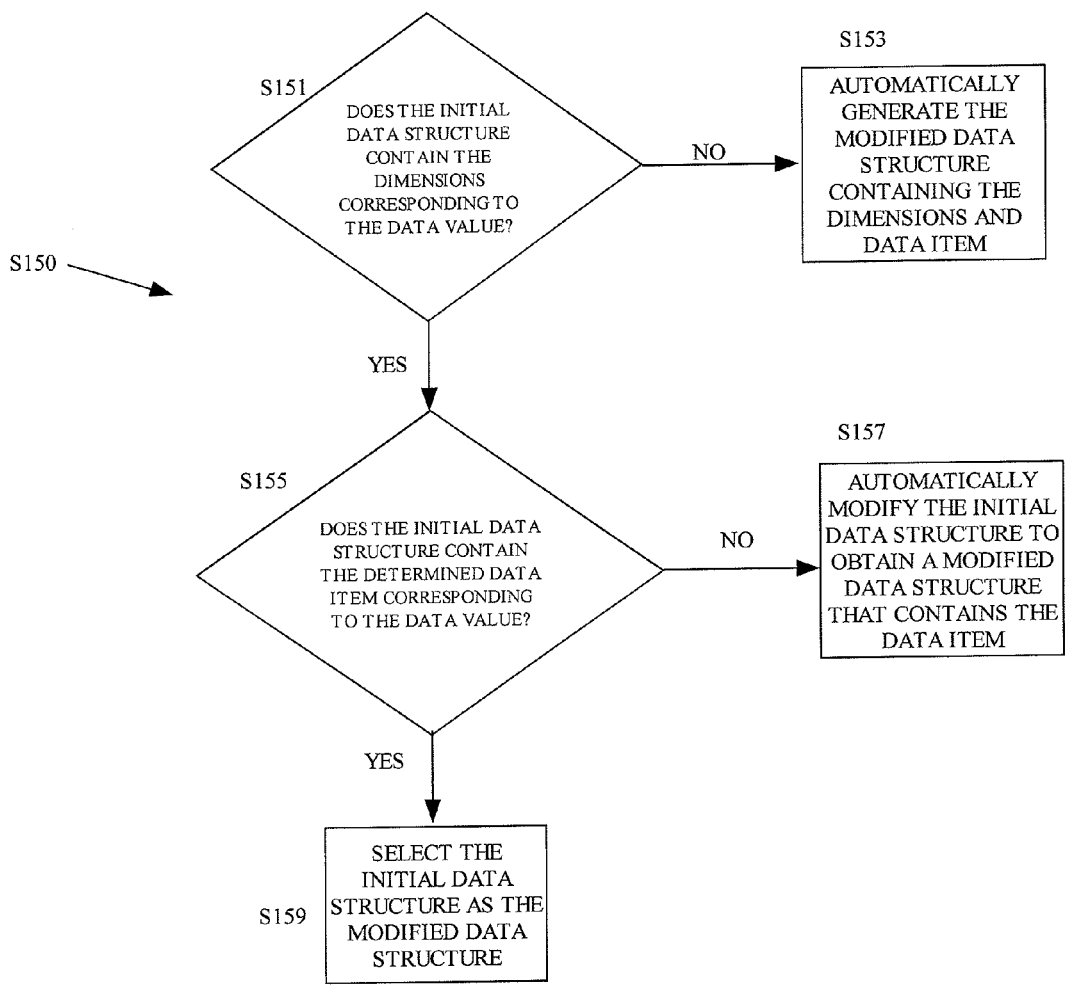
FIG. 4 is a flowchart showing substeps of one of the steps of the method shown in FIG. 3 according to an exemplary embodiment of the present invention.

In step S150, the initial data structure is dynamically reorganized into a modified data structure based on the dimensions and data items determined in steps S130 and S140. FIG. 4 is a flowchart showing sub-steps of the step S150 according to an exemplary embodiment of the present invention. In sub-step S151, for each newly entered data value, a determination is made as to whether the initial data structure contains the dimensions corresponding to the data value. If it is determined in sub-step S151 that the initial data structure does not contain the dimensions corresponding to the data value, process flows to sub-step S153, where the initial data structure is automatically modified to obtain a modified data structure containing the necessary dimensions and data item. For example, in the case in which the data structure is a database, a table may be added to the database that includes the dimensions and data item so that the newly entered data value may be stored in the table.

If it is determined in sub-step S151 that the initial data structure does contain the dimensions corresponding to the data value, process flows to sub-step S155, where a determination may be made as to whether the initial data structure contains the data item corresponding to the data value. If so, process continues to sub-step S159, where the initial data structure may be used to store the data value (i.e., the initial data structure is selected as the modified data structure). Otherwise, in sub-step S157, the initial data structure is automatically modified to obtain a modified data structure that contains the data item. For example, in the case in which the data structure is a database, a table within the database that contains the dimensions relating to the data value is modified by adding the data item relating to the data value to the table.

Returning now to FIG. 3, in step S160, the newly entered data is stored in the modified data structure.

Now that the preferred embodiments of the present invention have been shown and described in detail, various modifications and improvements thereon will become readily apparent to those skilled in the art. The present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. A method, comprising the steps of:
   storing on one or more computer readable media a database comprising initial data and an initial data structure;
   receiving at one or more processors operatively connected to one or more computer readable media new data as the new data is entered into an electronic document, the new data comprising at least one data value and one or more data descriptors corresponding to the at least one data value;
   automatically assigning using the one or more processors one of the one or more data descriptors as a data item, the data item defining a variable the value of which varies based on the data value;
   automatically determining, using the one or more processors and information from one or more repositories external to the initial data structure, one or more dimensions of the data value based on at least one of the one or more data descriptors;
   automatically determining, using the one or more processors, whether the initial data structure requires modification in order to accommodate storage and retrieval of the new data;
   upon a condition that a determination is made that the initial data structure requires modification, dynamically reorganizing without user input using the one or more processors the initial data structure into a modified data structure based on the at least one or more dimensions and the data item, so that the new data is stored in the modified data structure in a manner that allows the initial data and the new data to be later retrieved from the modified data structure;
   upon a condition that a determination is made that the initial data structure does not require modification, foregoing the step of dynamically reorganizing; and
   storing the initial data structure on the one or more computer readable media to include the new data in the modified data structure.

2. The method of claim 1, wherein the one or more dimensions of the data value are further determined based on information regarding the at least one of the one or more data descriptors as predefined in the initial data structure.

3. The method of claim 1, wherein the initial data structure comprises a virtual database.

4. The method of claim 1, wherein the initial data structure comprises a conventional database.

5. The method of claim 1, wherein the step of dynamically reorganizing comprises determining whether the initial data structure contains the one or more determined dimensions of the data value.

6. The method of claim 5, wherein, if it is determined that the initial data structure contains the one or more determined dimensions, the step of dynamically reorganizing further comprises determining whether the initial data structure contains the determined data item corresponding to the data value.

7. The method of claim 6, wherein, if it is determined that the initial data structure contains the determined one or more dimensions and the determined data item, the step of dynamically reorganizing further comprises selecting the initial data structure as the modified data structure.

8. The method of claim 6, wherein, if it is determined that the initial data structure does not contain the determined data item, the step of dynamically reorganizing further comprises modifying the initial data structure to form the modified data structure which contains the determined data item.

9. The method of claim 5, wherein, if it is determined that the initial data structure does not contain the determined one or more dimensions, the step of dynamically reorganizing further comprises automatically generating the modified data structure containing the determined one or more dimensions and data item.

10. The method of claim 1, wherein the electronic document comprises one or more of the following types of electronic documents: a spreadsheet, a business application software package, a word processing document, a webpage.

11. The method of claim 1, wherein the one or more dimensions comprises at least two dimensions.

12. The method of claim 1, wherein the initial data structure comprises a relational database.

13. The method of claim 1, wherein the initial data structure comprises a text database.

14. A computer-based system comprising a memory, one or more processors and a computer readable medium having instructions executable that, when executed on the one or more processors for performing a method for automatically and dynamically collecting new data entered into an electronic document, the method comprising the steps of:
   providing using the one or more processors a database comprising initial data and an initial data structure;
   retrieving using the one or more processors the new data as the new data is entered into the electronic document, the new data comprising a data value and one or more data descriptors corresponding to the data value;
   automatically assigning using the one or more processors one of the one or more data descriptors as a data item, the data item defining a variable the value of which varies based on the data value;
   automatically determining, using the one or more processors and information from one or more repositories external to the initial data structure, one or more dimensions of the data value based on at least one of the one or more data descriptors;
   automatically determining, using the one or more processors, whether the initial data structure requires modification in order to accommodate storage and retrieval of the new data;
   upon a condition that a determination is made that the initial data structure requires modification, dynamically reorganizing without user input using the one or more processors the initial data structure into a modified data structure based on the at least one or more dimensions and the data item, so that the new data is stored in the modified data structure in a manner that allows the initial data and the new data to be later retrieved from the modified data structure;
   upon a condition that a determination is made that the initial data structure does not require modification, foregoing the step of dynamically reorganizing; and
   storing using the one or more processors the new data in the modified data structure.

15. The computer-based system of claim 14, wherein the one or more dimensions of the data value are further determined based on information regarding the at least one of the one or more data descriptors as predefined in the initial data structure.

16. The computer-based system of claim 14, wherein the initial data structure comprises a virtual database.

17. The computer-based system of claim 14, wherein the initial data structure comprises a conventional database.

18. The computer-based system of claim 14, wherein the step of dynamically reorganizing comprises determining whether the initial data structure contains the one or more determined dimensions of the data value.

19. The computer-based system of claim 18, wherein, if it is determined that the initial data structure contains the one or more determined dimensions, the step of dynamically reorganizing further comprises determining whether the initial data structure contains the determined data item corresponding to the data value.

20. The computer-based system of claim 19, wherein, if it is determined that the initial data structure contains the determined one or more dimensions and the determined data item, the step of dynamically reorganizing further comprises selecting the initial data structure as the modified data structure.

21. The computer-based system of claim 19, wherein, if it is determined that the initial data structure does not contain the determined data item, the step of dynamically reorganizing further comprises modifying the initial data structure to form the modified data structure which contains the determined data item.

22. The computer-based system of claim 18, wherein, if it is determined that the initial data structure does not contain the determined one or more dimensions, the step of dynamically reorganizing further comprises automatically generating the modified data structure containing the determined one or more dimensions and data item.

23. The computer-based system of claim 14, wherein the electronic document comprises one or more of the following types of electronic documents: a spreadsheet, a business application software package, a word processing document, a webpage.

24. The computer-based system of claim 14, wherein the one or more dimensions comprises at least two dimensions.

25. The computer-based system of claim 14, wherein the initial data structure comprises a relational database.

26. The computer-based system of claim 14, wherein the initial data structure comprises a text database.

* * * * *